Patented Dec. 9, 1941

2,265,915

UNITED STATES PATENT OFFICE 2,265,915

ARTIFICIAL STRUCTURE AND PROCESS OF PRODUCING SAME

Leon Lilienfeld, deceased, late of Vienna, Germany, by Emerich Hunna, executor, Vienna, Germany; Antonie Lilienfeld, administratrix of said Leon Lilienfeld, deceased, assignor to Lilienfeld Patents Inc., Boston, Mass., a corporation of Massachusetts No Drawing. Application August 20, 1940, Serial No. 353,420. In Great Britain March 15, 1930

27 Claims. (Cl. 18—54)

In the prior applications of this inventor, 435,647 and 435,648 (now U. S. Patents 1,858,097 and 2,021,861 respectively), is described a process of making artificial structures including artificial threads, films, coatings, dressings, etc., in which hydroxy-alkyl derivatives (probably hydroxy-alkyl ethers) of cellulose are made by reacting with a halogen derivative of a polyhydric alcohol, (e. g. a chlorhydrin of a glycol or of glycerine) upon alkali cellulose. This product (as the crude reaction product or after purification or isolation) is then xanthated by action thereupon of $CS_2$ and an alkali, e. g. NaOH. The resulting product (believed to be a xanthate of a polyhydric alcohol ether of cellulose), is then dissolved in an alkaline solution, to form a more or less viscous solution, which can be then coagulated and plasticized by shaping and treatment with a coagulating bath, which may also be a coagulating and plasticizing bath, e. g. a strong acid, such as $H_2SO_4$ of 35% strength. It is preferable to also apply stretching during this treatment. The artificial structures produced are characterized by possessing a high tenacity (both in the dry and wet state), a high extensibility, high elasticity and high pliability, as compared with ordinary viscose silk.

The present invention is an improvement in or a modification of that described in said application 435,648, filed March 23, 1930 (now U. S. Patent No. 2,021,861).

The coagulating baths used for the production of the artificial structures herein (as in Patent 2,021,861) may be any of the coagulating baths commonly used in the coagulation of artificial structures from viscose, e. g. 8–15% solution of sulphuric acid, with or without the addition of neutral salts; or acid salts such as sodium bisulphate of like acidity, or solutions of ammonium salts of strong acids, e. g. ammonium sulphate or chloride, etc. Such solutions will hereinafter be referred to as simple coagulating baths. But also advantageously the so-called "plasticizing baths" heretofore proposed for the production of strong threads from viscose, can also be employed. Such plasticizing baths may contain 35% or more of sulphuric acid or other solutions of equivalent acidity, containing other acids or acid salts or mixtures including ammonium salts. Or alternatively the xanthate solutions can be introduced first into any simple coagulating bath commonly used in the viscose industry, and then the freshly coagulated structures treated with one of the so-called plasticizing baths, referred to above.

The shaped solution of the xanthate of cellulose ether is preferably introduced into a coagulating and plasticizing bath, e. g. sulphuric acid of 35–98% strength, e. g. 40%, 45%, 50%, 55%, 60%, 65% concentration, or a bath containing per liter 160 grams of $H_2SO_4$ and 320 grams of $NaHSO_4$, or a bath containing 25–30% of ammonium sulphate and optionally 10–20% of $H_2SO_4$, or a bath consisting of 500 parts of $NaHSO_4$ and 76 parts of $H_2SO_4$ of 66° Bé. and 587 parts of water, or a bath consisting of 180 parts of $Na_2SO_4$, 60 parts of ammonium sulphate and 15 parts of zinc sulphate, 135 parts of glucose, 128 parts of $H_2SO_4$ and 982 parts of water, or nitric acid of 60–90% strength, or phosphoric acid of 67.5% to 99% strength, or arsenic acid of 60–90% strength, or a 60% solution of zinc chlorid, with or without 5–6% of HCl added. These would be considered as "plasticizing baths." Or the shaped solution of the xanthate can be first introduced into one of the usual non-plasticizing baths commonly used in the viscose industry (e. g. 10–15% $H_2SO_4$ etc.), and then the freshly coagulated structure can be treated with one of the above "plasticizing baths" or any other plasticizing bath known in the art. With the use of plasticizing baths, artificial structures (e. g. artificial threads) of very high dry and wet tenacity are formed.

Coagulating baths as used in said Patent 2,021,861 (whether plasticizing or not) are also suitable in the present case.

In continuing his researches based on said application Ser. No. 435,648, (now Patent 2,021,862) the inventor has now discovered that it is possible to proceed in a similar manner and to obtain artificial shaped structures, for example threads having similar properties if, instead of the xanthates of hydroxy-alkyl derivatives of cellulose, xanthates of other cellulose ethers, and particularly xanthates of alkali soluble alkyl or aralkyl ethers of cellulose or xanthates of alkali soluble cellulose ethers of hydroxy acids (e. g. hydroxy-fatty acids) are used for the manufacture of artificial structures, for example artificial threads.

The process consists in giving a solution containing one or more of the xanthates of the cellulose ethers set forth above, the shape of an artificial structure desired, for example thread, and contacting the thus shaped solution with one or more suitable coagulating agents, or setting baths, such as those mentioned above.

As to the nature and properties of the alkyl or aralkyl ethers of cellulose to be xanthated for the present process, according to the knowledge obtained in the work of this inventor, it appears that so long as they are insoluble or substantially insoluble in water, most alkyl or aralkyl ethers of cellulose are very suitable for the present process, provided that they are soluble in caustic alkali solution or provided that they contain insufficient of the alkyl or aralkyl radical to be soluble in the usual volatile organic solvents. Those alkyl or aralkyl derivatives of cellulose which are insoluble in caustic alkali solution, but which are capable of absorbing caustic alkali solution are also to some degree suitable for being xanthated. In other words, the alkyl or aralkyl ethers should be capable of absorbing caustic alkali solution.

Practically the same holds good with the cellulose ethers of hydroxy acids to be xanthated for the present process. According to the inventor's knowledge, those that are soluble in caustic alkali solution are preferred, but at any event they must be capable of absorbing caustic alkali solution, in order to be used in this process, to give good products.

As stated above, the present process consists in bringing a solution of a xanthate of an alkali-soluble alkyl or aralkyl derivative of cellulose, or a xanthate of an alkali-soluble cellulose ether of a hydroxy acid into the form of an artificial structure, and contacting it with a coagulating agent. This latter may also, if desired, have also a plasticizing effect on the artificial structure during, or immediately after, its coagulation. It is also possible to first act upon the shaped solution with a coagulating agent and also, if desired, thereafter with an agent which has a plasticizing effect on the freshly coagulated material.

The plasticizing effect referred to can be accomplished in either of two ways (e. g. in the manufacture of supportless artificial structures, e. g. artificial threads). (1) The solution can be introduced into a coagulating bath, for example any of the coagulating baths commonly used in the viscose silk industry, for example a dilute solution containing a small percentage of an acid material, such as an acid salt or 5 to 15% of sulphuric acid, alone or also containing dissolved salts (e. g. MgSO₄, Na₂SO₄, alum etc.) or sugars (e. g. glucose, etc.) or softening agents, (e. g. glycerine) etc., and the freshly coagulated thread can then pass into a plasticizing bath such as a solution of H₂SO₄ of 35% or stronger, or other acid or acid material of equivalent strength, or a mixture of such acids, or any of the plasticizing baths set forth above. (2) Or the thread-like stream of the solution can pass directly into such plasticizing bath. The plasticizing bath may also contain salts, acid salts, sugars, softening agents, etc. A bath of sulphuric acid containing according to the spinning properties of the solution, 40 to 70% of H₂SO₄ is very useful for this purpose. The action of the strong acid bath is stopped when its effect has been sufficiently accomplished, e. g. washing, refrigerating, or the like.

The xanthates of the alkali-soluble alkyl or aralkyl ethers of cellulose or of the alkali-soluble cellulose ethers of hydroxy acids (namely ethers of hydroxy fatty acids or of other hydroxy-carboxylic acids e. g. of hydroxy-succinic acid) may be prepared for example according to the processes described in the copending application 521,023 of this inventor, or according to any other suitable process or method. Satisfactory methods are disclosed herein.

The alkali-soluble cellulose ethers of the various types set forth above, may be made according to any suitable process or method.

The ethers of cellulose, as referred to in the present specification, contain at least one of the hydroxyl groups of the cellulose, in an unsubstituted condition, which hydroxyl is accessible to xanthation. The ethers contain only a low content of the substituent radical, connected ether fashion to the cellulose radical.

The xanthates of the said alkyl or aralkyl derivatives of cellulose and the xanthates of cellulose ethers of hydroxy acids may be worked up into artificial materials, for instance threads; alone or in conjunction with other colloids, such as cellulose xanthate or xanthates of other cellulosic bodies or various alkali-soluble water-insoluble cellulose derivatives. Such combination with cellulose xanthate may be effected by mixing a solution of a xanthate of an alkyl- or aralkyl-cellulose or of a xanthate of a cellulose ether of a hydroxy acid with viscose or by dissolving cellulose xanthate (sulphidized alkali cellulose) in a solution of a xanthate of an alkyl- or aralkyl-cellulose or of a xanthate of a cellulose ether of a hydroxy acid by dissolving a xanthate of an alkyl- or aralkyl-cellulose or a xanthate of a cellulose ether of a hydroxy acid in viscose, or by conducting the present process so that the carbon bisulphide is allowed to act in the presence of caustic alkali upon a mixture of an alkyl or aralkyl derivative of cellulose and cellulose, or upon a mixture of a cellulose ether of a hydroxy acid and cellulose, for example by treating alkali cellulose with an alkylating or aralkylating agent or with a halogen fatty acid under such conditions that only part of the cellulose contained in the alkali cellulose is converted into the corresponding ether of cellulose and thereafter, by acting upon this intermediate product with carbon bisulphide, converting the thus obtained reaction mass into a mixture of a xanthate of the corresponding ether with cellulose xanthate. Also other alkali soluble derivatives of cellulose or alkali soluble cellulose hydrates or proteins or gelatine may be added to and mixed with the xanthates of the cellulose ethers.

Any suitable softening agents, such as glycerine or a glycol or a sugar, such as glucose or a soap or Turkey-red oil, or a drying or non-drying oil, or any elasticizing agents, for example a halogen derivative of a di- or a polyvalent alcohol, particularly a halohydrin, such as a dichlorohydrin or a mono-chlorohydrin or ethylene chlorohydrin may be added to the solutions of the xanthates.

Within the broad scope of the invention, any chemical coagulating or precipitating agent or mixture of precipitating agents or mixture of precipitating agents with other inorganic or organic substances known in the viscose art may be used in the present process. Excellent results, particularly with regard to tensile strength, are obtained when the freshly coagulated material is exposed to the action of a plasticizing agent (but this step is optional). This purpose can be accomplished either by using as the setting bath a liquid which has a coagulating effect on the shaped solutions of xanthates of alkyl or aralkyl ethers of cellulose, or the xanthates of hydroxy-carboxylic acid ethers of cellulose and a plasticizing effect on the coagulated solution (for example, a bath containing not less than 35 per cent of sulphuric acid monohydrate or an equivalent quantity of another mineral acid or a fair amount of a zinc halide, e. g. 48 to 60% of zinc chloride, alone or mixed with an acid), or by employing as setting bath a liquid that has only a coagulating effect on the formed solutions of said xanthates (for example, any coagulating but not plasticizing bath known in the viscose art) and subsequently (if desired), acting upon the freshly coagulated artificial structure with a bath that has a plasticizing effect on it, for example with a liquid having a high content of strong mineral acid, particularly having a sulphuric acid content of not less than 35% of monohydrate, or the plasticizing baths given above.

Since the practice of the process is parallel to that set forth in the aforesaid specification, Ser. No. 435,648 and explained therein by aid of numerous examples, it appears unnecessary to repeat here all particulars relating to the carrying out of the present process under various working conditions and to give here examples demonstrating all possible modifications of executing the present invention. In conjunction with the detailed description and the examples of specification Ser. No. 435,648, the following examples appear to be sufficient to illustrate the practical execution of the invention which however is by no way limited to these examples.

*Example I*

1000 parts of wood-pulp (moisture 9 to 10 per cent) or 1000 parts of cotton linters (moisture 7 to 8 per cent) are steeped in 20,000 parts of caustic soda solution of 18 per cent strength at 15° C., and the reaction mixture is allowed to stand for 3 hours at room temperature. After this time the alkali cellulose is pressed down to 3400 parts and comminuted in a shredder for 3 hours at 12 to 13° C., whereupon 100 parts of dimethyl sulphate are added in a few portions, and the reaction mass kneaded in a shredder for about 3 hours. Thereafter the reaction mass is transferred to a vessel, provided with a lid and kept in the closed vessel for 21 hours at 20° C.

The reaction mass is now placed in a filter press or on a straining cloth and washed with water until free from alkali, whereupon it is pressed down to about three to four times the weight of the parent cellulose. The water content of the pressed product can be determined by drying a sample at 105° C.

The mass is now (at 15° C.) well mixed with such amounts of water and caustic soda as to give a mass containing 20,000 parts of a caustic soda solution of 18 per cent strength. In selecting the amounts of caustic soda and water to be used, the water content of the pressed mass is taken into consideration.

The reaction mixture is now allowed to remain at room temperature for 3 hours, whereupon it is pressed down to 3400 to 4500 parts and comminuted in a shredder for 3 hours at 12 to 13° C. Immediately after shreddnig 600 parts of carbon bisulphide are added, and the reaction mass placed in a closed vessel and kept therein for 10 hours at 19° C., whereupon the excess carbon bisulphide is blown off during 15 minutes.

The crude methyl cellulose xanthate so obtained (or obtained in any other suitable manner, or the corresponding ethyl compound), is dissolved in such a quantity of water and caustic soda as to yield a solution containing about 5 to 6.5 per cent of precipitable cellulose body and about 8 per cent of NaOH and, after having aged for about 96 hours and filtered, is spun in a manner similar to the methods described in the examples of U. S. Patent 2,021,861. Thus, in this and the following examples of the present application the solution of the xanthate (after filtration—several times if necessary) can be forced in well known manner through a spinning nozzle into a coagulating bath, for example the coagulating bath containing in each liter 160 grams of $H_2SO_4$ and 320 grams of $Na_2SO_4$ which bath can be used at about 45° C. In this bath the sodium sulphate is given as an example of a soluble sulphate.

Also a bath of 10% sulphuric acid at 16° C. or 40° C., can be used in this and the following examples.

Furthermore, in this and the following examples, a coagulating and plasticizing bath containing over 35 per cent of $H_2SO_4$, and preferably at least 45 per cent of $H_2SO_4$, e. g. 50 per cent or 55 per cent or 60 per cent or 65 per cent or 70 per cent may be used.

Or the stream of xanthate solution can be first extruded into a single coagulating bath, such as the well known Muller bath, and then it can pass through a plasticizing bath, as mentioned above. Instead of sulphuric acid, the plasticizing bath can be another mineral acid of equivalent strength, or a strong zinc halide (e. g. $ZnCl_2$ solution of 60% strength) with or without the addition of an acid (e. g. a 60% $ZnCl_2$ solution with or without 4 to 6% of HCl).

The details of the spinning operation are well known in the art.

It is favorable to subject the threads to stretching during the process of making same. This step is to some extent optional.

Also when plasticizing coagulating baths are used in this or the following examples, during spinning the thread may be given additional stretching, i. e. stretching additional to the degree of tension necessary to conduct the thread from the spinning nozzle to the collecting device. But the use of additional stretching is not a necessary condition.

*Example II*

The process is conducted as in Example I, but with the difference that the alkyl cellulose xanthate is dissolved in such a manner that the spinning solution contains about 4 to 6.5 per cent of precipitable cellulose body and 5 per cent of NaOH.

*Example III*

1000 parts of wood pulp or cotton linters are steeped in 20,000 parts of caustic soda solution of 18 per cent strength at 15° C., and the reaction mixture is allowed to stand for 3 hours at room temperature. After this time the alkali cellulose is pressed down to 3400 parts and comminuted in a shredder for 3 hours at 12 to 13° C., whereupon 200 parts of dimethyl sulphate are added in a few portions, and the reaction mass kneaded in a shredder for 3 hours at 20° C. Thereafter the reaction mass is transferred to a vessel, provided with a lid, and kept in the closed vessel for 21 hours at 20° C.

A sample taken at that time shows that the mass in greater part has become soluble in dilute caustic soda solution (for instance of 10 per cent strength) and that the filtered solution, on being acidified with dilute sulphuric acid, yields a bulky precipitate.

The mass is now dissolved in 75,000 parts of a caustic soda solution of 8 per cent strength, wherein it dissolves not completely, but leaving an undissolved residue. After standing for 12 hours at room temperature, the solution is filtered and the clear filtrate precipitated by acidifying with sulphuric acid of 15 per cent strength. The flocculent precipitate is freed from the mother liquor in a filter press or on a straining cloth, washed with water until free from acid, pressed and its water content is determined. This material is now dissolved in such a quantity of water and caustic soda as to yield a solution containing about 5-7 per cent of methyl cellulose and 8 per cent of NaOH.

To this solution 100 per cent of carbon bisulphide (calculated on the weight of the cellulose methyl ether) are added and the reaction mixture kept with shaking or agitation for 20 hours at 20° C.

After the solution has attained a total age of 48 hours and has been filtered during aging, the solution is spun in a manner similar to the methods described in the examples of my specification Ser. No. 435,648.

In this example 200 parts of dimethyl sulphate were used. Other amounts of this material, such as 100 to 600 parts of the dimethyl sulphate could be used.

Example IV

A crude ethyl cellulose xanthate is prepared as in Example I, but with the difference that, instead of dimethyl sulphate 100 to 200 parts of di-ethyl sulphate are employed. The ethyl cellulose xanthate is dissolved in such a quantity of water and caustic soda as to yield a solution containing about 5 to 6.5 per cent of cellulosic substance precipitable by acid and about 8 per cent of NaOH and, after having aged for about 96 hours and been filtered, spun in a manner similar to the methods described in Example I, or in the examples of the Patent 2,021,861.

Example V

Instead of the alkyl cellulose xanthates employed in the foregoing examples, an alkyl cellulose xanthate produced from an alkyl cellulose prepared according to any one of the processes described in U. S. Patent 1,589,606 or British Patents Nos. 203,346 or 203,347, may be employed in the present process.

In the first of these British Patents, No. 203,346, the alkyl derivatives of cellulose which are soluble in alkali solutions but not in water, as described in U. S. Patent 1,589,606, are prepared by heating 100 parts of cellulose or an alkali-insoluble conversion product of cellulose with an alkylating agent, e. g. 80 parts of ethyl chloride in the presence of a quantity of solid caustic soda which is about half the weight of the air-dried cellulose. The cellulose is mixed with the solid caustic alkali, preferably in powder form, or with a mixture of solid caustic alkali and saturated alkali lye, in a shredder, edge runner, or kneading machine, and the mass heated to 100-110° C., with the alkylating agent, in an autoclave, while being agitated. If the kneading of the cellulose and caustic alkali is carried out with access of air, the mass will take up moisture therefrom.

In the second of said British patents, Number 203,347, the alkyl derivatives of cellulose which are soluble in alkali solutions but not in water, described in said U. S. Patent 1,589,606, are prepared by treating an alkali-soluble conversion product or derivative of cellulose with an alkylating agent in a proportion which does not exceed one molecule of alkylating agent to one molecule of cellulose ($C_6H_{10}O_5$), and preferably in the proportions of about one-third to two-thirds of a molecule of alkylating agent. The parent material, which is preferably soluble in an aqueous alkali solution, may be viscose, or a cellulose hydrate obtained by dissolving cellulose in ammoniacal cupric oxide or in a strong mineral acid, and subsequently precipitating. After gently heating with the alkylating agent, the alkyl cellulose derivative is precipitated from the viscous solution by the addition of acid or water. In an example, the reacting materials are 2000 parts of viscose containing 160-170 parts of cellulose and the same amount of NaOH, and the alkylating agent is 50-100 parts of diethyl sulphate. The alkylating reaction in this example directly produces an alkaline solution of an ethyl ether of cellulose.

Example VI 1000 parts of wood-pulp (moisture 9 to 10 per cent) or 1000 parts of cotton linters (moisture 7 to 8 per cent), are steeped in 20,000 parts of caustic soda solution of 18 to 21 per cent strength at 15° C. and the mass thus obtained is allowed to stand for 3 hours at room temperature. After this time the alkali cellulose is pressed down to 3400 parts and comminuted in a shredder for 3 hours at 12 to 13° C., whereupon 2900 parts of di-ethyl sulphate are added in a few portions, and the reaction mass kneaded in a shredder for about 3 hours. Thereafter the reaction mass is transferred to a vessel provided with a lid and kept in the closed vessel for 21 hours at 20° C.

The reaction mass is now placed in a filter press or on a straining cloth and, if desired, washed with water until free from alkali, whereupon it is pressed down to about three to four times the weight of the parent cellulose. The water content of the pressed product can be determined by drying a sample at 105° C.

The mass is now (at 15° C.) well mixed with such amounts of water and caustic soda, as, together with the water present in the mass, will give 20,000 parts of a caustic soda solution of 18 per cent strength.

The reaction mixture is now allowed to remain at room temperature for 3 hours, whereupon it is pressed down to 3400 to 4500 parts and comminuted in a shredder for 3 hours at 12 to 13° C. Immediately after shredding, 600 parts of carbon bisulphide are added, and the reaction mass placed in a closed vessel and kept therein for 10 hours at 19° C. The excess carbon bisulphide is blown off during 15 minutes, and the xanthated mass dissolved in water and caustic soda, for example so as to yield a solution containing about 5 to 7 per cent of the dry residue of the mass pressed after the alkylation and washing and 8 percent of caustic soda.

The solution thus obtained is aged for 96 hours at 15° C. during which time it is filtered twice to three times through medicated cotton wool. The spinning of the aged solution is performed in a manner similar to the methods described in the examples of the specification Ser. No. 435,648.

Example VII

The process is conducted as in Example VI, but with the difference that, instead of 2900 parts, 2200 parts of diethyl sulphate are employed.

Example VIII

The process is conducted as in Example VII, but with the difference that, instead of 2900 parts, 290 parts of diethyl sulphate are employed.

Example IX

The process is conducted as in either of the Examples VI or VII or VIII, but with the difference that after the ethylating step the original reaction mass, without being washed, (and which already contains an excess of free alkali), is acted upon with 600 parts of carbon bisulphide for 10 hours at 20° C. The resultant mass (xanthate of ethyl xanthate) is dissolved in such a quantity of water and caustic soda as to yield a solution containing about 6 to 7 per cent of precipitable cellulosic substance and 8 per cent of NaOH.

The filtered solution, after having aged for 48 hours, at 15° C., is spun in a manner described in the examples of Patent 2,021,861.

*Example X*

The process is conducted as in any of the Examples I to IV or VII to IX but with the exception that the alkali cellulose is allowed to mature for 48 hours at 15 or 20° C.

In the manufacture of the shaped structures from the solution of a xanthate of an alkali-soluble alkyl ether of cellulose, the coagulation can conveniently be effected in a bath containing 25% or more of sulphuric acid, or other acid solution of like acidity, to give artificial structures of high dry and wet tenacity. The action of the strong acid bath on the thread or other structure can be checked by subjecting the shaped structure to washing or refrigeration, when the action of the acid has been sufficiently accomplished. This can be accomplished by subjecting the thread to a low temperature, for instance −5 to −15° C. before it is washed, which for instance may be done by collecting it on a hollow spool containing a cooling agent, for instance solid carbonic acid, or a freezing mixture, or ice.

After the threads (made in this or the other examples of this case) have been washed, they may be heated or steamed at high temperatures (for instance 100° to 110° C.) before or after the drying process.

Any desulphurization or bleaching of the threads is conducted in the known manner. Or the threads (etc.) may also be desulphurized according to the process described in U. S. Patent 2,004,875, for instance, by treating them in the heat with a solution of $Na_2S.9H_2O$ of 10 per cent strength for 5 minutes to one hour or with a solution of $Na_2S.9H_2O$ of 30 per cent strength for about 5 to 10 minutes.

*Example XI*

The crude xanthate of a cellulose ether of glycollic acid may be obtained if instead of the dimethyl sulphate in Example I, hereof, 300 parts of monochloroacetic acid is employed. Such xanthate is dissolved in such quantities of water and caustic soda as to yield a solution containing about 5 to 6.5 per cent of cellulosic substance precipitable by acid and about 8 per cent of NaOH. The xanthate solution, after having aged for about 96 hours and having been filtered, is spun in a manner similar to the methods described in the examples of Patent 2,021,861.

*Example XII*

Alkali cellulose is prepared and comminuted as in Example I, using the quantities of materials there stated. To this is added 300 parts of monochloracetic acid in the form of its sodium salt, as the etherifying agent. The hydroxy-acetic acid ether of cellulose after washing, is dissolved in such amounts of water and caustic soda (e. g. at about 19 to 22° C.) as to yield a solution containing 5 to 7% of the cellulose ether of glycollic acid and 8% of NaOH. To this solution is added an amount of carbon bisulphide equal to the weight of the said cellulose ether, and the mixture is kept at 20° C. for 20 hours, with agitation, to form a solution of the xanthate of glycollic acid ether of cellulose. This solution can be kept for another 28 hours, if desired. This solution (after having been filtered) is then used to make structures according to any of the coagulation methods of this application or of the Patent 2,021,861.

In modifications of this example there may be used (instead of 300 parts) 200 parts or 400 to 500 parts of the monochloracetic acid (in the form of its sodium salt).

*Example XIII*

1000 parts of wood-pulp or cotton linters are steeped in 20,000 parts of caustic soda solution of 20% strength at 15° C. and the reacting mixture allowed to stand for 3 hours at 15° C. whereupon the alkali cellulose is pressed down to 2,000 parts and comminuted in a shredder for 3 hours at 15° C. The shredded alkali cellulose, after having been matured for 3 days at 18 to 20° C. is placed in a rotating drum whereupon 600 parts of benzyl chloride are added and the reacting mass gently heated to 52–55° C. by means of a water bath in which the drum rotates, and which temperature is maintained for 8 hours. After that time the crude reaction mass is extracted several times with alcohol of 95 per cent strength and then washed with water and pressed down to 2200 parts. The pressed cake is comminuted and well mixed with 4600 parts of caustic soda solution of 22 per cent strength at 18° C.

The reaction mass is now allowed to stand for 24 hours at 18° C. and then pressed down to 2000 parts. The pressed cake is comminuted in a shredder for 3 hours at 11° C. and then kept in a closed vessel for 72 hours at 21° C., whereupon 600 parts of carbon bisulphide are added and allowed to react for 10 hours at 20° C. After the excess of the carbon bisulphide has been blown off, the reaction mass is dissolved in so much water and caustic soda as to yield a solution containing about 6 to 7 percent of precipitable cellulosic substance and 8 per cent of NaOH and the solution is filtered.

The filtered solution, after having aged for 48 hours at 15° C. is then spun in a manner described in the examples of Patent No. 2,021,861.

*Example XIV*

The process is conducted as in the last Example XIII, but with the difference that, after the benzylating step, the reaction mass is, without being washed, acted upon with 600 parts of carbon bisulphide for 10 hours at 20° C. The resultant mass is dissolved in such a quantity of water and caustic soda as to yield a solution containing about 6 to 7 per cent of precipitable cellulosic substance and 8 per cent of NaOH.

The filtered solution, after having aged for 48 hours at 15° C. can be spun in a manner described in the examples of U. S. Patent 2,021,861.

It will be understood that instead of a single etherifying agent, as given in the above examples, a mixture of two or more etherifying agents can be used in a similar manner, or two or more etherifying agents can be added one after another, to the alkali cellulose.

*Example XV*

The process is conducted as in any one of the preceding examples, but with the difference that the cellulose ether xanthate is dissolved in so much water and caustic alkali as to yield a solution containing about 3 per cent of precipitable cellulosic substance and 5 per cent of NaOH.

For the carrying out of this example it is recommended to start with a cellulose of high viscosity (determined by the customary methods).

Example XVI

Mode of procedure as in any one of the preceding examples, but with the difference that to the spinning solution 10 to 30 parts of α-dichlorohydrin or α-monochlorhydrin or ethylene chlorohydrin to 100 parts of the cellulosic substance contained therein, are added after the dissolving step.

Example XVII

A spinning solution, produced in the manner described in any one of the foregoing examples is introduced in the known manner through a suitable hopper or slit, in the form of a thin sheet into one of the coagulating baths mentioned herein or in Patent 2,021,861, and the coagulated film band, after having been run through this bath, is washed in the known manner and dried.

Example XVIII

A cotton textile is impregnated or filled, or coated, one or several times, in a suitable machine, for instance a padding machine or a back filling machine, or a spreading machine, with a spinning solution produced in the manner described in any one of the foregoing examples, to which solution a filling material such as talc or china clay or zinc white (for instance 100 to 200 per cent calculated on the weight of the precipitable cellulosic substance) or a dyestuff or a pigment, such as mica, or lampblack, may be added and without being dried, if necessary in a state of tension, is pressed through a bath having the composition of one of the coagulating liquids mentioned in Patent 2,021,861. The dressed or coated cloth is then washed and dried.

In the above description, reference is made repeatedly to the fact that the ethers of cellulose to be xanthated, in the present invention are in most cases "alkali-soluble," that is to say, they can be dissolved in aqueous caustic alkali solutions. This statement is not intended to mean that the ethers will necessarily dissolve in caustic alkali solutions in water at room temperature, but they can be readily dissolved in the aqueous caustic alkali solution in the cold (e. g. at 0° C., or at between —10° C. and +5° C.) and the solutions then allowed to warm up to room temperature.

The amount of the substituted radical, e. g. alkyl, aralkyl or the hydroxy-acid radical, is relatively low, in these ethers.

The following Table 1 is given showing the alkyl content of the alkyl ethers formed by the alkylation treatment in several of the above examples. In said table, column A gives the example number, column B gives the amount and kind of alkylating agent (stated as percentage of the weight of the cellulose used). Column C gives the alkyl content in the etherified cellulose, (after purification and alkylation, and before xanthation) produced in carrying out the respective example, this being the results of the actual analysis (by the Zeisel test). Column D shows the number of $C_6H_{10}O_5$-molecular units of cellulose, per one alkyl group in that particular product, this figure being computed from the data in column C.

*Table 1*

| A | B | C | D |
|---|---|---|---|
| I | 10% Me₂SO₄ | 0.67% CH₃ | 12.7 |
| III | 20% Me₂SO₄ | 1.37% CH₃ | 6.5 |
| IV | 10% Et₂SO₄ | 1.08% C₂H₅ | 14.3 |
| IV | 20% Et₂SO₄ | 1.49% C₂H₅ | 10.3 |
| V | a—12.5% EtCl | 1.38% C₂H₅ | 11.1 |
| Ex. 1 of 1,589,606 | { a—12.5% EtCl / b—20% EtCl | 1.78% C₂H₅ | 8.61 |
| Ex. 2 of 1,589,606 | { a—12.5% EtCl / b—20% EtCl | 1.59% C₂H₅ | 9.6 |
| | | 2.34% C₂H₅ | 6.5 |
| VI | 290% Et₂SO₄ | 1.84% C₂H₅ | 8.28 |
| VII | 220% Et₂SO₄ | 1.44% C₂H₅ | 10.57 |

Other tests on similarly made products—

| | | | |
|---|---|---|---|
| G | 60% Me₂SO₄ | 1.60% CH₃ | 5.35 |
| H | 20% Me₂SO₄ | 1.37% CH₃ | 6.5 |
| J | 60% Et₂SO₄ | 4.31% C₂H₅ | 3.54 |
| K | 30% Et₂SO₄ | 2.66% C₂H₅ | 5.73 |

It will be understood that in the above table, Me₂SO₄ is used to mean "dimethyl sulphate" and that Et₂SO₄ is used to mean "diethyl sulphate", and EtCl means ethyl chloride.

It will be observed that the alkylation reactions as given in the examples never produce the introduction of anything like the theoretical amount of the alkyl groups.

In the above Table 1, alkyl ethers only are discussed, and not the benzyl ethers or the glycollic acid ethers. This is for the reason that no thoroughly accurate methods are known for making a determination of the benzyl group in the benzyl ethers of cellulose, nor for making a determination of the hydroxy-acid residue (e. g. glycollic acid residue) in the cellulose ethers containing these. But by computation from the amounts of cellulose and of benzyl chloride or of chloracetic acid used, it will be observed that the degree of substitution of the respective groups will necessarily also be relatively low. And the properties of these ethers (notably insolubility in the commonly used organic solvents and the solubility in aqueous alkali solutions) also indicate that the degree of substitution is relatively low.

In further researches of this inventor it has been shown that ethers of cellulose which contain less of the substituent radicals than indicated in the above examples, and which do contain less of the substituent radicals than would be necessary to give solubility in aqueous caustic alkali solutions (even by refrigeration) are still suitable for xanthation to give useful xanthate solutions, for the preparation of shaped artificial structures.

As a guiding line with regard to the question whether or not the alkali cellulose should be allowed to mature before being brought together with the etherifying agent, may, among others, serve the desired viscosity of the solution which is to be worked up into artificial structures in general and artificial threads in particular, and in connection therewith the viscosity of the particular cellulose to be employed. If it is desired to give the solution a definite viscosity, then the alkali cellulose produced from the kind of cellulose contemplated is subjected to a maturing process, if without maturing this kind of cellulose yields a higher viscosity. If, however, without maturing it exhibits the desired viscosity, then maturing is superfluous. Now, as the viscosities of the many different kinds of cellulose on the market (linters and wood-pulp) differ very much from one another, the question of maturing depends in most cases on the one hand on the viscosity desired of the initial solution intended for the manufacture of artificial structures, and on the other hand on the viscosity of the kind of cellulose being worked.

Without restricting the present invention to any lower or upper limits of tenacities or extensibility, it may be mentioned by way of example that it is possible to produce according to the present process artificial threads which have a dry tenacity exceeding 2 grams and even reaching or exceeding 5 grams per denier, that have a good extensibility, say of about 7 to 10 and in some cases even 10 to 15 per cent and more.

In the specification and claims, wherever the context permits, the expression "cellulose" includes the near conversion products and oxydation products of cellulose, such as cellulose hydrate, hydrocellulose and oxycellulose.

In lieu of the xanthates of suitable methyl- or ethyl- or benzyl-derivatives of cellulose, xanthates of homologues of these ethers, for example of suitable propyl- or amyl-ethers of cellulose and in lieu of the xanthates of cellulose ethers of glycollic acid, xanthates of cellulose ethers of homologues of glycollic acid, for example a xanthate of cellulose ether of lactic acid or hydroxy-butyric acid may be employed in the present invention.

The expression "strong mineral acids" denotes sulphuric acid of at least 35 per cent of $H_2SO_4$, preferably at least 45 percent of $H_2SO_4$, and as regards the other mineral acids, solutions of equivalent strength.

The expression "strong sulphuric acid" or "sulphuric acid containing at least about 35 per cent of sulphuric acid monohydrate" denotes sulphuric acid having a content of 35 to 98 per cent of $H_2SO_4$.

The expression "shaped artificial structures" used in the specification and claims includes: Artificial threads, particularly artificial silk; films; coatings and layers of every kind; dressing on textiles, paper, leather and the like, sizing on yarns; book cloth; artificial leather; adhesives and cements; plates and shaped plastic compositions in general; thickening agents or fixing agents for pigments in textile printing and the like.

The xanthates and methods of making same, as herein described are claimed in a copending application 365,392 filed November 12, 1940 (which is largely a continuation of Ser. No. 521,023 filed March 7, 1931), the present case being in major part a continuation of copending allowed application 521,017, also filed March 7, 1931.

The alkyl ethers of cellulose described herein, and the mode of preparing same are not claimed herein but are claimed in a copending application 314,359, filed January 17, 1940.

What is claimed is:

1. A process of making a shaped artificial product from a solution which contains a dissolved xanthate of an alkali-soluble cellulose ether other than a hydroxy-alkyl cellulose ether, which comprises the step of coagulating the said material by contacting said solution, while formed into the shape of the desired artificial product, with a precipitating agent.

2. A process of making a shaped artificial structure which comprises bringing a solution of a xanthate of a cellulose ether selected from the group consisting of xanthates of alkali-soluble alkyl ethers of cellulose, xanthates of alkali-soluble aralkyl ethers of cellulose and xanthates of alkali-soluble hydroxy-acid ethers of cellulose, into the shape of the desired artificial structure, and acting upon the shaped solution with a coagulating agent.

3. A process of making a shaped artificial structure, which comprises giving to a solution containing a xanthate of a cellulose ether selected from the group consisting of xanthate of an alkali-soluble alkyl ether of cellulose, xanthate of an alkali-soluble aralkyl ether of cellulose, and xanthate of an alkali-soluble hydroxy-acid ether of cellulose, the shape of an artificial structure by extruding said solution through a shaped opening directly into a coagulating bath, and continuously drawing the coagulated artificial structure away from said shaped opening.

4. A process of making an artificial structure which comprises bringing a solution containing a xanthate of a cellulose ether selected from the group consisting of xanthate of an alkali-soluble alkyl ether of cellulose, xanthate of an alkali-soluble aralkyl ether of cellulose and xanthate of an alkali-soluble hydroxy-acid ether of cellulose, into the form of an artificial structure, and coagulating and plasticizing such product.

5. A process as in claim 4, in which the coagulating and plasticizing actions are effected in a bath containing mineral acid equivalent in strength to sulphuric acid of at least 35% $H_2SO_4$.

6. A process which comprises treating a solution containing a xanthate of a cellulose ether selected from the group consisting of xanthate of an alkyl ether of cellulose, xanthate of an aralkyl ether of cellulose and xanthate of a hydroxy-acid ether of cellulose, and which ether contains only one substituent radical joined ether-fashion to several $C_6H_{10}O_5$-molecular units of cellulose, and while said solution has the form of an artificial structure, with a coagulating agent and plasticizing the freshly coagulated shaped structure.

7. A process as covered in claim 2, wherein the xanthate solution to be worked up into an artificial structure is produced by treating with carbon bisulphide an at least partially dissolved cellulose ether selected from the group consisting of alkyl ether of cellulose, aralkyl ether of cellulose and hydroxy-acid ether of cellulose, which ether is at least partially soluble in caustic alkali solution and insoluble in water.

8. The herein described process of producing artificial structures of high tensile strength and of at least fairly good extensibility which comprises introducing a shaped stream of a solution of a xanthate of an alkali-soluble cellulose ether selected from the group consisting of xanthate of an alkyl ether of cellulose, xanthate of an aralkyl ether of cellulose and xanthate of a hydroxy-acid ether of cellulose, into a coagulating bath and plasticizing the freshly coagulated artificial structure, all without subjecting the formed artificial structure to additional stretch.

9. A process of making an artificial structure which comprises bringing a solution of a xanthate of an alkali-soluble alkyl ether of cellulose into the shape of the desired artificial structure, and acting upon the shaped solution with a coagulating agent.

10. A process of making an artificial structure which comprises bringing a solution of a xanthate of an alkali-soluble alkyl ether of cellulose into the shape of the desired artificial structure, and acting upon the shaped solution with a solution containing at least about 35% of sulphuric acid.

11. A process of making a regenerated artificial structure which comprises treating alkali cellulose with an alkylating reagent in such proportions as to produce an alkyl ether of cellulose containing at least about 3.54 $C_6H_{10}O_5$-molecular units of cellulose per one alkyl group, xanthating the cellulose ether so produced, dissolving the xanthated ether to form a viscous solution, giving the said viscous solution the shape of the desired artificial structure, and acting upon the so shaped solution with a coagulating agent.

12. A process which comprises spinning into an acid setting bath having an acidity equivalent to that of sulphuric acid of not substantially below 45% concentration, an alkaline solution of a xanthate of an alkyl ether of cellulose, which ether contains an alkyl radical in amount equivalent to not substantially over 4.31% of ethyl.

13. A process comprising dissolving in dilute aqueous caustic alkali solution, a xanthate of a hydrocarbon ether of cellulose, said ether containing only one hydrocarbon ether group to a plurality of $C_6H_{10}O_5$-molecular units of cellulose, extruding the solution into an acid coagulating bath, and washing and drying the coagulated product.

14. A process comprising dissolving in dilute aqueous caustic alkali solution, a xanthate of an ethyl ether of cellulose, said ether containing only one ethyl group to a plurality of $C_6H_{10}O_5$-molecular units of cellulose, extruding the solution into an acid coagulating bath, and washing and drying the coagulated product.

15. A process of making a regenerated artificial structure which comprises treating alkali cellulose with a reagent containing the acid radical of a halogenated fatty acid, xanthating the cellulose ether so produced, dissolving the xanthated ether to form a viscous solution, giving the said viscous solution the shape of the desired artificial structure, and acting upon the so shaped solution with a setting bath containing not substantially below 45% of $H_2SO_4$.

16. As a new product, a shaped artificial structure containing a cellulose ether selected from the group consisting of alkyl ether of cellulose, aralkyl ether of cellulose and hydroxy-acid ether of cellulose, and which product has a tenacity, in the dry state, equivalent to over 2 grams per denier and which product has an extensibility of at least 10%, which product is produced by shaping a solution of a xanthate of an alkali-soluble cellulose ether selected from the group consisting of xanthate of an alkyl ether of cellulose, xanthate of an aralkyl ether of cellulose and xanthate of a hydroxy-acid ether of cellulose, into the appropriate shape, and coagulating the so shaped material.

17. As new products, a shaped artificial structure containing a cellulose ether selected from the group consisting of alkyl ether of cellulose, aralkyl ether of cellulose and hydroxy-acid ether of cellulose and which products have a dry tenacity equal to that of a thread having a dry tenacity of not less than 2 grams per denier.

18. As a new product, a shaped artificial structure, which has a dry tenacity equivalent to more than 2 grams per denier and which contains an ether of cellulose other than a hydroxy-alkyl ether, such product being made by contacting a shaped solution containing a xanthate of an alkali-soluble cellulose ether other than a hydroxy-alkyl ether, with a coagulating bath.

19. As a new product, a shaped artificial structure which has a dry tenacity equivalent to more than 2 grams per denier, and which contains at least one alkyl ether of cellulose, such product being made by contacting a shaped solution containing a xanthate of an alkali-soluble alkyl ether of cellulose, with a coagulating bath.

20. As a new product, an artificial structure which is composed essentially of an alkyl ether of cellulose, regenerated from a xanthate of an alkali-soluble alkyl ether of cellulose.

21. A structure comprising a hydrocarbon ether of cellulose which contains only one hydrocarbon ether group to a plurality of $C_6H_{10}O_5$-molecular units of cellulose, said cellulose ether being regenerated from a solution of a xanthate thereof.

22. A textile product having a dressing which contains a cellulose ether selected from the group consisting of alkyl ethers of cellulose, aralkyl ethers of cellulose and hydroxy-acid ethers of cellulose, which textile product is produced by applying to a textile material a dressing containing an aqueous alkaline solution of a xanthate of an alkali-soluble ether of cellulose selected from said group, and coagulating said solution while carried by said textile material.

23. An artificial thread or filament containing a cellulose ether selected from the group consisting of alkyl ether of cellulose, aralkyl ether of cellulose and hydroxy-acid ether of cellulose such product having a dry tenacity of over 2 grams per denier, and an extensibility of over 10%, which product is produced by shaping a solution of a xanthate of a cellulose ether selected from the group consisting of xanthate of an alkali-soluble alkyl ether of cellulose, xanthate of an alkali-soluble aralkyl ether of cellulose and xanthate of an alkali-soluble hydroxy-acid ether of cellulose into the appropriate shape, and coagulating the so shaped material.

24. As a new product, an artificial thread which consists essentially of at least one cellulose ether selected from the group consisting of alkyl ether of cellulose, aralkyl ether of cellulose and hydroxy-acid ether of cellulose, which thread has a dry tenacity exceeding 2 grams per denier, and an extensibility over 10%.

25. As a new product, an artificial thread containing a cellulose ether selected from the group consisting of alkyl ether of cellulose, aralkyl ether of cellulose and hydroxy-acid ether of cellulose, which thread has a dry tenacity exceeding 2 grams per denier, and a wet tenacity exceeding 1 gram per denier, and an extensibility exceeding 10%.

26. A thread comprising a cellulose ether of up to one hydrocarbon ether group to 3.54 $C_6H_{10}O_5$-molecular units of cellulose, said cellulose ether being regenerated from a solution of a xanthate thereof.

27. As a new product, shaped artificial thread which has a dry tenacity equivalent to more than 2 grams per denier and which contains at least one aralkyl ether of cellulose, such product being made by contacting a shaped solution of a xanthate of an aralkyl ether of cellulose with a coagulating agent.

EMERICH HUNNA,
*Executor of the Last Will and Testament of Leon Lilienfeld, Deceased.*